United States Patent [19]

Bentin

[11] 4,413,268

[45] Nov. 1, 1983

[54] JET NOZZLE FOR AN INK JET PRINTER

[75] Inventor: Horst Bentin, Hamburg, Fed. Rep. of Germany

[73] Assignee: U.S. Philips Corporation, New York, N.Y.

[21] Appl. No.: 328,877

[22] Filed: Dec. 9, 1981

[30] Foreign Application Priority Data

Dec. 20, 1980 [DE] Fed. Rep. of Germany ....... 3048259

[51] Int. Cl.[3] .............................................. G01D 15/18

[52] U.S. Cl. .................................................. 346/140 R

[58] Field of Search .......................... 346/1.1, 75, 140; 29/157 C; 239/596, 597, 601, DIG. 19

[56] References Cited

U.S. PATENT DOCUMENTS 3,466,659 9/1969 Ascoli ............................. 346/140 IJ 3,774,231 11/1973 Tullos ............................. 346/140 R 3,887,928 6/1975 Ohno et al. ........................ 346/75 X 3,958,249 5/1976 DeMaine et al. .......... 346/140 IJ X 4,349,830 9/1982 Rudd ............................. 346/140 IJ

*Primary Examiner*—Donald A. Griffin

*Attorney, Agent, or Firm*—Robert S. Smith

[57] ABSTRACT

In jet nozle printers in which the ink droplets are ejected individually from one or more jet nozzles for a matrix print, an orifice to produce a uniform, axially proceeding ejection of ink droplets in the nozzle direction. The jet nozzles are shaped such that the orifice is provided with a sharp edge, both in its interior region and also closely around this region, the jet nozzle brim thus formed radially around the orifice having a uniform width of not more than 20 μm. The cross-section of the wall surrounding the jet nozzle orifice forms an acute-angled triangle, the apex forming the jet nozzle brim.

4 Claims, 22 Drawing Figures

JET NOZZLE FOR AN INK JET PRINTER

BACKGROUND OF THE INVENTION

1. Field of the Invention

The invention relates to a jet nozzle for an ink jet printer having a ring-shaped obstruction which impedes the spread of the ink, particularly in the form of a sharp edge provided adjacently around the discharge orifice, the plane of the orifice being perpendicular to the longitudinal axis of the jet nozzle.

2. Description of the Prior Art

A jet nozzle of this type is known from FIG. 3 of the German Auslegeschrift No. 23 62 576. The discharge orifice is adjacently surrounded by a trough which must ensure a concentric separation of the ink droplet. The edges between the nozzle brim and the trough then act as an obstruction against wetting by the ink.

From German Auslegeschrift No. 15 11 379 it is further known to provide the outer edge of such a nozzle brim with a sharp edge, while the areas contiguous to this edge have different degrees of roughness. This must ensure that when several jet nozzles are used, the flow properties of all the jet nozzles are made substantially equal to each other. As furthermore the individual ink droplets are produced by continuous motion of the ink and are subsequently deflected in different directions by means of an electrostatic field, discharging the ink droplets in a direction which is accurately perpendicular to the discharge orifice of the jet nozzle is not required. The dimensions of the jet nozzle are comparatively large. The width of the jet nozzle brim and also the diameter of the jet nozzle are 0.1 mm.

Jet nozzles of this type are, however, not suitable for use in ink jet printers which operate on the "droplet-on-demand" principle, that is to say whose ink droplets are ejected individually from the jet nozzle and which land on the record carrier only after a free flight without external influences. As the ink droplets then ejected exceed the inside diameter of the jet nozzle discharge orifice, this orifice must be chosen as small as possible. In order to obtain a proper matrix print the dimensions of the jet nozzles are of an order of magnitude from 50 to 100 μm in diameter. In view of the above-mentioned reasons, the smallest value must be aimed at as much as possible.

Compared with such small dimensions the 0.1 mm-wide jet nozzle brims of the prior art jet nozzle configurations constitute a comparatively large surface area and these configurations may consequently be compared with jet nozzles whose discharge orifices lie in a plane with the upper surface area of a jet nozzle plate. FIGS. 1*a* to 1*f* shows such a jet nozzle discharge orifice and the individual stage of the ink droplet ejection. The starting point is a dry jet nozzle FIG. 1*a*. When a voltage is applied to the associated droplet generator, not shown, the still concave meniscus of the ink is made convex, the overall jet nozzle orifice being filled with liquid until a given value of the curvature of the meniscus is reached FIG. 1*b*. The diameter of the parabolic curvature is determined by the diameter of the jet nozzle. From a given curvature, which depends on the structure of the internal limiting jet nozzle wall and also on the boundary surface tension of the jet nozzle material a lateral extending wetting of the exterior outer surface (sideways-pointing arrow) occurs in addition to the desired ejection direction (arrow pointing upward from the injection nozzle). This is equivalent to extending the diameter of the jet nozzle. This virtual increase of the jet nozzle diameter results in a reduced initial speed of the ejected ink droplets. The adhesion of the ink to the lateral surface consequently results in a loss in energy. The size of the wetting ring depends on the boundary surface tension, the flow rate of the ink and the shape of the pulse generated by the printing generator. The geometry of this wetting varies in conformity with surface area defects, contaminations and chemical reactions. The size of the wetting ring also depends on the frequency with which the ink droplets are ejected, and will be the higher according as ink droplets are ejected more often. If, after several ejections, the wetting reaches an exterior obstruction in accordance with the above-mentioned prior art apparatus, a further spread is then finally prevented from occurring. As in the ejection of droplets as shown in FIGS. 1*a* to 1*f* the starting point is that on the discharge of the first ink droplet the wetting power of the near nozzle brim region is still approximately equal because of its dry condition, the first drops will most probably be ejected in the desired axial direction with respect to the jet nozzle FIG. 1*d*. The wetting edge will however not be accurately limited in the radial direction with respect to the jet nozzle brim. After the voltage from the drop generator has been switched off, the ink is sucked back into the jet nozzle and a further concave meniscus is formed. Residual ink which depending on the condition of the jet nozzle brim is of an irregular shape FIG. 1*e* and FIG. 1*e'* stays behind on the jet nozzle brims. The next pulse of the drop generator then results unavoidably in a deflection of the ejected ink droplet FIG. 1*f*, as the lateral forces then acting on this droplet are different in different directions. These forces are the greater according as more ink stays behind on a section of the jet nozzle brim.

Furthermore, this irregular wetting increases at higher drop formation rates, so that the rate of printing is strongly reduced. The after-flow and backflow after the ejection of a droplet furthermore prevent the desired early rest position of the concave meniscus, so that also at lower ejection rates highly unwanted drop speed fluctuations are observed. The higher the viscosity of the ink used, the more pronounced the after-flow is. Consequently, the uncontrollable wetting of plane jet nozzle front portions or jet nozzle front portions which may be considered as being plane result in a deterioration of the technically required printing quality and printing speed.

In order to satisfy the requirements which may be imposed on a very good printing quality, the jet nozzles of the jet nozzle printer must ensure a reproducible and stable drop formation. So an accurate axial ejection of the ink drop must be accomplished.

SUMMARY OF THE INVENTION

The invention has for its object to provide a construction of the nozzles of a jet nozzle printer in which the ink droplets are individually ejected for a free, unaffected flight, the ink droplets being ejected uniformly and always in the direction of the axis of the nozzle and a ring-shaped and radially uniform boundary surface tension being formed closely around the nozzle brim, which tension defines and limits in a ring-shaped manner the lateral wetting even after the ejection of the first ink drop.

This object is accomplished in that the orifice itself has a sharp edge and that the concentric nozzle brim defined by the ring-shapd obstruction and the orifice has a width from 0 to 20 μm. Suitably, the orifice of the nozzle is of such a construction that subsequent to the ring-shaped obstruction there is a trough surrounding the nozzle brim and that the wall surrounding the raised orifice thus formed is in cross-section an acute-angled triangle, whose apex forms the jet nozzle brim. Instead of this triangular cross-section a rectangular cross-section may alternatively be used whose narrow side must then however have a width less than 20 μm. It is alternatively possible to position the orifice in the plane of the surface area of a jet nozzle plate surrounding the orifice. In that case the nozzle brim must be made of a material that is easily wettable by the ink, for example silicon or silicon oxide, and the remaining portions of the surface area of the jet nozzle plate of a far from easily wettable material, for example steel, nickel, the nozzle brim being worked into or inserted in the jet nozzle plate.

The invention has the advantage that the jet nozzle brim is of necessity uniformly wetted by the residual ink, even when first there is non-uniform wetting by the ejected ink droplet. Because of the fact that the overall jet nozzle brim must be considered as having a sharp edge, the residual ink distributes itself immediately (even before the ejection process of the following ink droplet starts) uniformly over the whole jet nozzle brim. A further advantage is that after-flow of the residual ink in the jet nozzle channel after ejection is considerably reduced, which renders it possible to considerably increase the ejection rate.

BRIEF DESCRIPTION OF THE DRAWINGS

The invention will now be further explained by way of example with reference to some embodiments in the accompanying drawings, wherein:

FIG. 1*d'* to 1*f* show a top plan view of residual ink on the jet nozzle brim of FIGS. 1*a* to 1*f*;

FIGS. 4*a* to 4*k* show individual stages of the ejection of ink by a jet nozzle in accordance with the invention.

DESCRIPTION OF THE PREFERRED EMBODIMENT

Figure 1A:
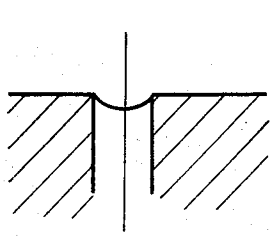
FIG. 1a PRIOR ART
FIGS. 1*a* to 1*f* show individual stages in the ink ejection of a prior art jet nozzle configuration.
Figure 1B:
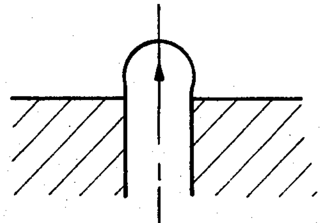
FIG. 1b PRIOR ART
Figure 1C:
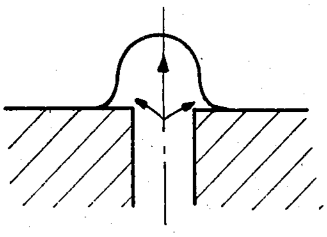
FIG. 1c PRIOR ART
Figure 1D:
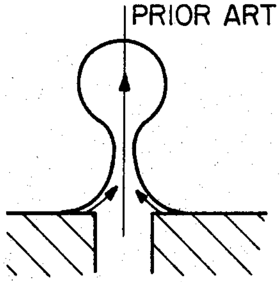
FIG. 1d PRIOR ART
Figure 1E:
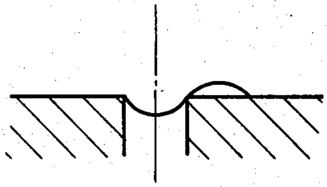
FIG. 1e PRIOR ART
Figure 1F:
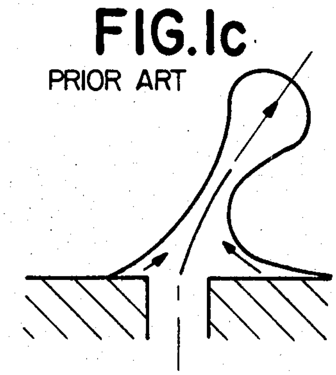
FIG. 1f PRIOR ART
Figure 1D:
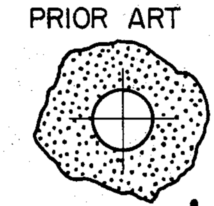
FIG. 1d' PRIOR ART
Figure 1E:
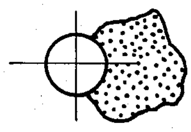
FIG. 1e' PRIOR ART
Figure 1F:
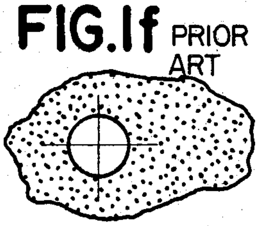
FIG. 1f' PRIOR ART
Figure 2:
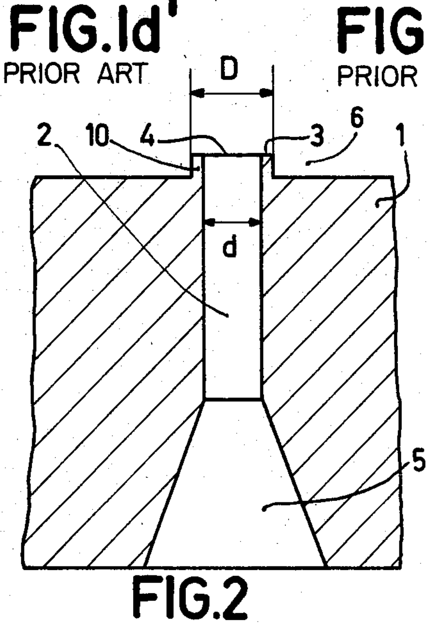
FIG. 2 shows an example of a jet nozzle configuration in accordance with the invention.

For matrix printing by means of ink jet printers in which the ink droplets are ejected or sprayed individually, several drop generators are combined whose printing channels are capped by means of a removable jet nozzle front plate 1 (FIG. 2). The configuration of the jet nozzles 2 in this front plate 1 is determined by the pattern in the vertical direction of the character to be printed. For a given printing quality effective jet nozzle spacings of approximately 100 μm are required. The configuration of the jet nozzles can be effected in several rows with staggered raster spacings. The diameter d of the jet nozzle 2 is approximately 50 μm. The length of the portion which acts as a nozzle is a multiple of the jet opening, for example 3 to 4 times. The jet nozzle 2 has a run-in conical portion 5 having an angle of aperture of approximately 20° to 45;20 , in order to enable its connection to a liquid ink channel (not shown) having a diameter of 0.3 mm.

Figure 3:
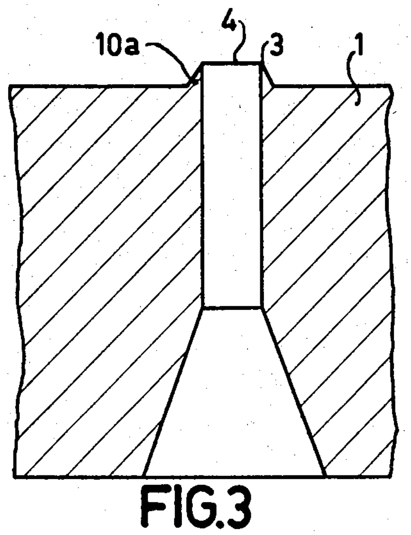
FIG. 3 shows a further example of the jet nozzle configuration in accordance with the invention.
Figure 4E:
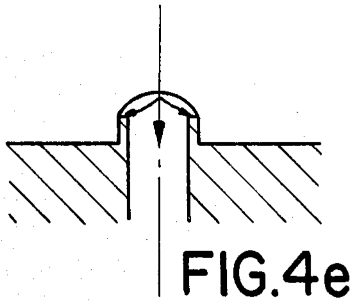
Figure 4D:
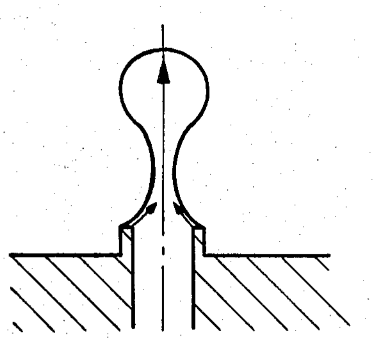
Figure 4C:
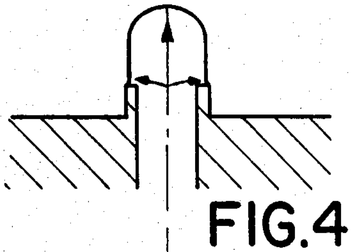
Figure 4B:
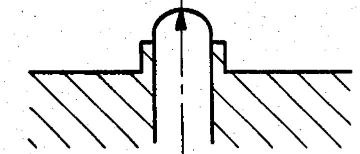
Figure 4A:
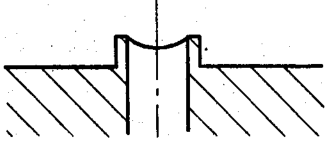
Figure 4K:
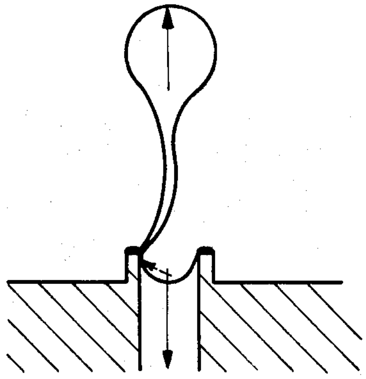
Figure 4I:
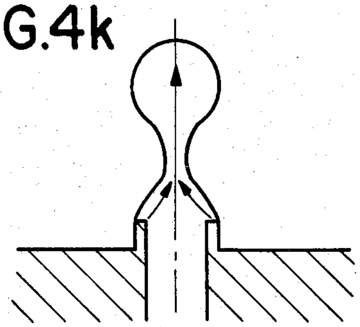
Figure 4H:
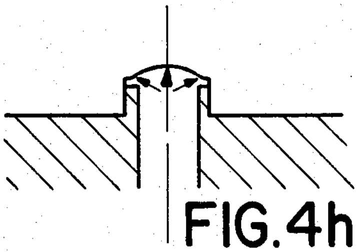
Figure 4G:
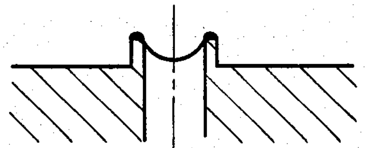
Figure 4F:
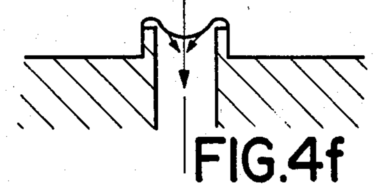
Figure 6A:
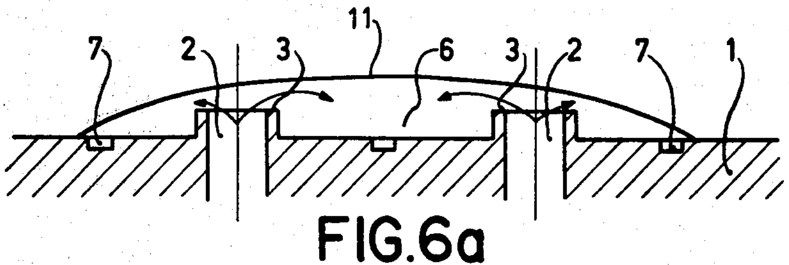
FIGS. 6*a* and 6*b* show an arrangement of several jet nozzles as shown in FIG. 2, which are flooded with liquid ink for cleaning the jet nozzle.

A trough 6 is provided around the orifice 4 of the jet nozzle 2 in the jet nozzle plate (this is shown in FIG. 6*a*). The orifice 4 is surrounded by a jet nozzle brim 3. The two edges of this ring-shaped jet nozzle brim 3 which are formed on the one hand by the jet nozzle 2 and on the other hand by the trough 6, have sharp edges. The inside diameter of the jet nozzle brim 3 corresponds to the jet nozzle diameter d and the outside diameter D of the jet nozzle brim is only slightly larger, so that the difference D-d is extremely small. This difference must be as close as possible to 0, but for reasons of manufacture differences up to 20 μm are permissible. The jet nozzle orifice 4 as shown in FIG. 2 is surrounded by a wall 10 having a rectanguar cross-section whose small side forms the sharp-edged jet nozzle brim 3. FIG. 3 shows an embodiment in which the jet nozzle brim 3 is kept small owing to the fact that the cross-section of the wall 10*a* in this region forms an acute-angled triangle whose apex forms the jet nozzle brim 3. This jet nozzlek shape having an acute-angled triangular cross-section 10*a* must be approached as far as possible. The lateral wetting in the immediate vicinity of the jet nozzle edge must in any case be ring-shaped and uniform on all sides.

FIGS. 4*a* to 4*k* show single stages of the drop ejection as it appears at the jet nozzle shown in FIG. 2. As the jet nozzle brim is dry before the first drop emerges, the stages 4*a* to 4*d* do not differ from the stages 1*a* to 1*d* shown in FIG. 1. Accurate wetting of the jet nozzle brim has indeed already been reached in stage 4*d*. After ejection of the ink droplet the ink is sucked back into the jet nozzle due to the natural vibration of the liquid column. This process is shown in the stages 4*e* and 4*f*. After this reflux has ended, and before the ejection procedure of a second drop starts there remains on the jet nozzle brim 3 an accurately defined wetting which is no longer in connection with the liquid in the jet nozzle due to the sharp edge of the orifice. This instant is shown in stage 4*g*. After the ejection of the next ink droplet has started in stage 4*h*, the ink present in the jet nozzle channel meets a uniform residual wetting at the jet nozzle brim. As the jet nozzle brim is regular and has a sharp edge, the lateral forces caused by the residual wetting are very small and their force will be equal in every direction. This ensures an axial separation of the droplet from the jet nozzle, as represented in stage 4*i*. For such a shape of the jet nozzle it is then of no consequence if the separation of the ink droplet in stage 4*k* ends in the center or in any fringe area.

Figure 5A:
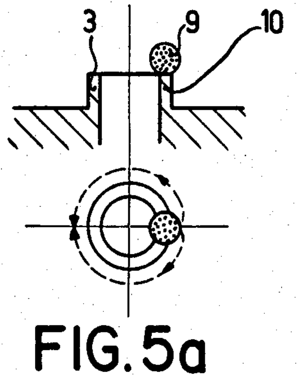
FIGS. 5*a* and 5*b* show the behavior of the ink on the jet nozzle brim after one ink droplet has been ejected.
Figure 5B:
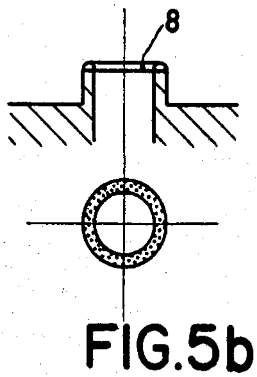

As shown in FIGS. 5*a* and 5*b* with the sharp-edged form of the jet nozzle brim 3 it is of no consequence if immediately after separation of the ink droplet the wetting of the jet nozzle brim 3 is irregular. This is shown in FIG. 5*a* in an exaggerated manner, as it is assumed here that the residual ink 9 retained on the jet nozzle brim 3 is in the form of a drop. As both the interior edge and also the exterior edge of the jet nozzle brim are sharp and the two edges almost coincide, the ink droplet 9 will of necessity distribute itself uniformly over the entire jet nozzle brim 3, without flowing over its edges. This situation is shown in FIG. 5*b*.

FIG. 6 shows a portion of a jet nozzle plate 1 having two jet nozzles 2 as shown in FIG. 2. Between the jet nozzle 2 there are troughs 6 whose center portions are provided with a discharge channel 7 for the reflux of the ink.

Figure 6B:
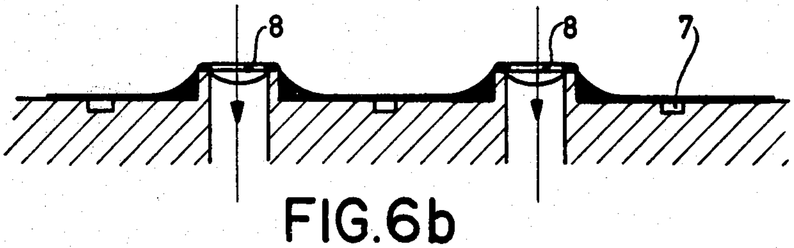

The raised ring-shaped, sharp-edged jet nozzle brim 3 accomplishes that the excess ink which can be discharged through the reflux channels 7 is separated from the ink present in the jet nozzles 2, which ink can be utilized to clean the jet nozzles. For this purpose the jet nozzles are flooded, for example by exerting pressure on the ink storage compartment. This flooding is represented in FIG. 6*a* by the arrows and by the quantity of ink 11 over the jet nozzles 2. Due to the subsequent static underpressure in the jet nozzles 2, the jet nozzles clean themselves in the region of the jet nozzle brims 3. As described above, this is accomplished by the forced separation of the excess ink in the trough 6 from the ink in the jet nozzles 2. The excess ink in the troughs 6 is discharged through the channels 7. This situation is shown in FIG. 6*b*.

The concentric troughs 6 around the jet nozzles 2 furthermore prevent the large critical surface areas of the jet nozzle front plate from becoming contaminated by paper dust and dye residues. The troughs 6 are of such a form that the level of the ring-shapd jet nozzle brim 3 is the same as that of the surface of the jet nozzle plate 1 located outside the trough 6.

An essential technical property of this arrangement is that the reflux after the ejection of an individual drop is reduced which enables a marked increase in the drop rate. By limiting the wetting 8, the reflux processes to reach the ultimate rest position of the meniscus are adjusted in a defined manner, so that also inks having a higher viscosity can be utilized for a controlled drop formation.

What is claimed is:

1. A jet nozzle plate for an ink jet printer, comprising a plurality of substantially cylindrical jet nozzles each having a discharge orifice, the plane of the orifice being perpendicular to the longitudinal axis of the jet nozzle, the orifice being surrounded by a nozzle brim having sharp edges, the width of the nozzle brim being between 0 and 20 um, a trough (6) being provided around the jet nozzle brim.

2. A jet nozzle plate as claimed in claim 1, characterized in that the wall between the orifice and the trough has in cross-section an acute-angled triangle whose apex forms the jet nozzle brim (3).

3. A jet nozzle plate as claimed in claim 1, characterized in that the orifice (4) is in a plane with the surface area of the adjacent jet nozzle plate (1) surrounding it and that the jet nozzle brim (3) consists of a material which is easily wettable by the liquid ink and that the further surface are of the jet nozzle plate (1) consists of a material which is far from easily wettable by the liquid ink.

4. A jet nozzle plate as claimed in any one of claims 1 to 3, characterized in that the orifice (4) has a diameter of approximately 50 um.

* * * * *